Dec. 20, 1966 P. C. SHERBURNE 3,292,917
PIPE HANGER
Filed Jan. 25, 1965
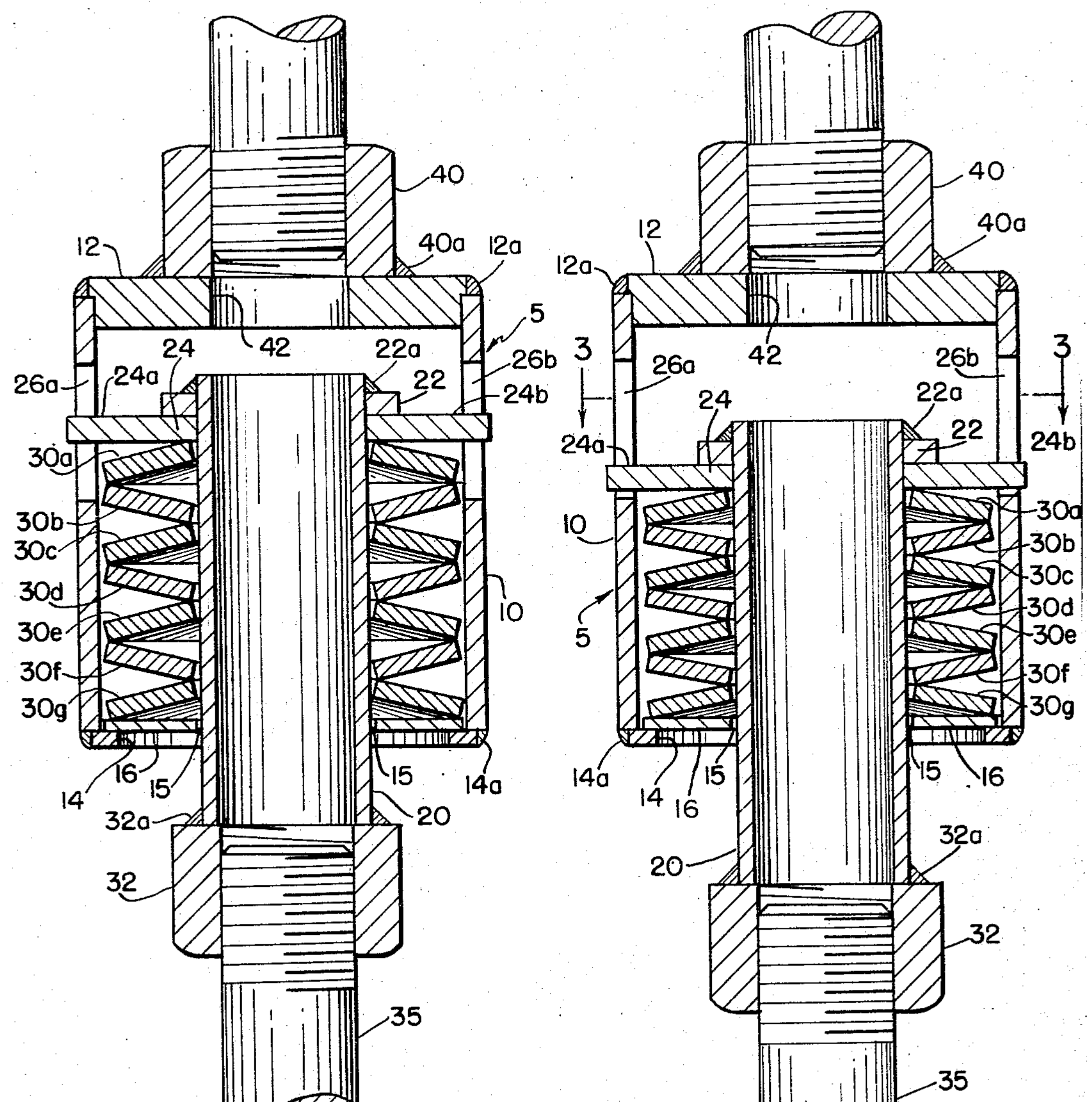
FIG. 1
FIG. 2
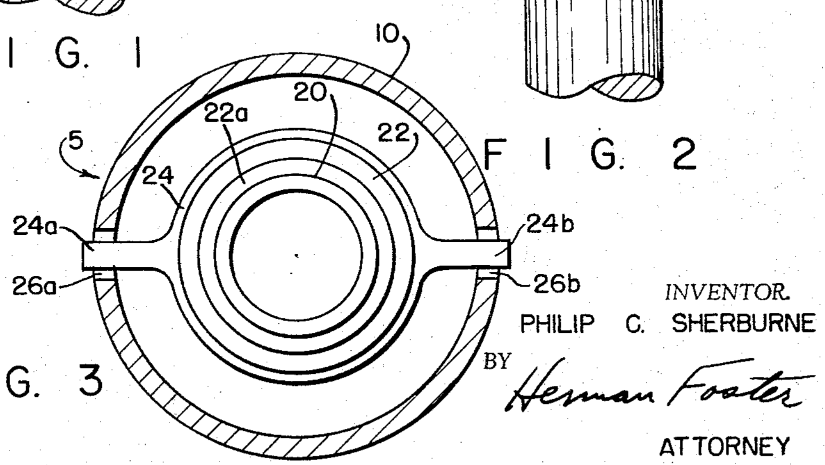
FIG. 3
INVENTOR.
PHILIP C. SHERBURNE
BY *Herman Foster*
ATTORNEY United States Patent Office 3,292,917
Patented Dec. 20, 1966

3,292,917
PIPE HANGER

Philip C. Sherburne, East Providence, R.I., assignor to Grinnell Corporation, Providence, R.I., a corporation of Delaware Filed Jan. 25, 1965, Ser. No. 427,552
3 Claims. (Cl. 267—1)

This invention relates to a spring device for yieldingly supporting a load such as piping or the like and more particularly deals with a spring support structure subject to large loads with small movements.

It has generally been the practice heretofore, when large piping loads (e.g. in excess of 30,000 lbs.) are required to be supported in installations such as power plants, to use what has come to be known in the trade as a constant support hanger. An example of such a hanger is described in U.S. Reissue Patent No. Re. 24,050 issued to W. S. Rouverol and dated Aug. 9, 1955. Even though such hangers are very accurate and quite expensive their load carrying capacities have caused them to also be used with high loads where the accuracy of movement has little significance, for example, where the expected load movement has been slight (e.g. in the order of ¼").

Where such slight load movements are expected a less expensive canister type spring hanger, such as is described in U.S. Reissue Patent No. 22,980 to A. B. Donkersley et al., issued on March 9, 1948, might normally be accdeptable in lieu of the constant support hanger if it were capable of supporting large loads. However, under very heavy loads, a coil spring such as is shown in the Donkersley et al. patent is generally unsuitable because of the probability that such a spring will be overloaded. Therefore, to overcome the problem of overloading, a multiple spring formed from a plurality of springs has been used. This results in a large increase in physical size and weight, and brings the cost of such a canister hanger within range of the constant support hanger.

Part of the increased weight and size of such a canister hanger is attributable to the heavier components which have been required throughout to transmit the large forces. For example since the most suitable coil springs are generally cylindrical in configuration and since the hanger casing has normally taken a canister configuration, a heavy transverse collar has generally been necessary to transfer the load from the hanger rod at the center of the canister to the spring in the canister near the outer wall of the canister. This was so because of the moment of forces imposed between the hanger rod and the spring.

The present invention has, through a novel arrangement of disc springs (often referred to as Belleville springs), made it possible to eliminate the requirement for a heavy load transmitting collar such as has been described.

The answer to the problem outlined above does not lie merely in the use of disc or Belleville springs. For, if such springs are used in pairs as shown, for example, in U.S. Patents Nos. 2,981,511 and 3,118,643 to L. S. Suozzo then, although a heavy transverse collar may not be needed, the end of the canister against which the spring rests must be sufficiently heavy to withstand the moment of forces which arises from the transmission of the spring force from adjacent the hanger rod to the cylindrical shell of the canister.

Further, by using the novel spring arrangement of the present invention complex interior load transmitting structures can be abolished with a resulting simplification of the entire hanger construction. This contributes to the attainment of a lower cost for the canister hanger, and makes its use for large loads and small movements more attractive.

Other advantages of the invention will become apparent from the following description and accompanying drawing which describe and show for illustrative purposes only a preferred embodiment of the invention.

In the drawing:

FIG. 1 is a side elevational cross-section view of a hanger built in accordance with the principles of the present invention under a working loaded condition.

FIG. 2 is a view similar to that of FIG. 1 showing the same hanger in a fully loaded condition.

FIG. 3 is a view taken along line 3—3 of FIG. 2.

Referring in greater particularity to the drawing, 10 denotes a cylindrical shell which with end plate 12 and retaining ring 14 makes up the major portion of the hanger casing 5. Each of plate 12 and ring 14 is normally fastened at its outer circumference to the shell, preferably by welding as indicated at **12*a* and 14*a*. Since the ring 14 would normally leave so much of the interior of the casing 5 exposed to undesirable elements a cover plate 16 is utilized on ring 14** to protect the interior of the casing.

Within the casing 5 is a tubular coupling member 20 which is coaxial with the shell 10 and extends through a hole 15 in the plate 16. At the upper end of the coupling member a collar 22 is joined to the coupling member by means of welding indicated at **22*a*. Beneath the collar is an indicator member 24 which is held in place against the collar 22 by the stacked springs 30*a*, 30*b*, 30*c*, 30*d*, 30*e*, 30*f* and 30*g*. The indicator member has fingers 24*a* and 24*b* extending through slots 26*a* and 26*b* respectively in the shell 10**.

At the lower end of the coupling member 20 a threaded hexagonal nut 32 is joined to the coupling member by means indicated at **32*a*. A load supporting threaded rod 35 is inserted into the nut 32** during installation.

Externally of end plate 21 and concentric with the coupling member 20 is a hexagonal threaded nut 40 joined to the end plate 12 by means of welding indicated at **40*a*. A hole 42 extends through the end plate 12 and corresponds to and is concentric with the threaded hole in the nut 40. A support rod 41 which is fastened to a fixed structure (not shown) and is threaded into nut 40** holds the hanger in its desired position.

Between the indicator member 24 and the bottom end plate 14 are disc springs **30*a*, 30*b*, 30*c*, 30*d*, 30*e*, 30*f* and 30*g*. Unlike prior spring arrangements in which an even number of disc springs are used, the present construction utilizes an odd number of springs with the spring 30*g* at the end plate end, bearing on the ring 14 adjacent the shell 10 and the spring 30*a* at the collar end of the coupling member 20 bearing on the collar 22** adjacent the coupling member.

In operation as a downward load is imposed by the supported pipe (not shown) on rod 35 the springs exert a resisting force, against movement of the coupling member 20 in the direction of the load. The path of this resisting force is directed from the fixed casing 5 to the outer edge of spring **30*g*. The resisting force is then transmitted from spring to spring until it reaches spring 30*a*. Because of its partial dished shape, disc spring 30*a* transmits resisting force to the collar 22 adjacent the outer periphery of the coupling 20. In the embodiment illustrated in the drawing the force is transmitted through the indicator member 24**. However, an indicator member may be located elsewhere in relation to the coupling member and need not necessarily be interposed between the collar and springs.

It will be seen that the force imposed on collar 22 by the disc springs is imposed at a relatively small distance from the coupling member 20. Thus, the primary stress factor which is likely to be imposed on the collar 22 is that of shear rather than bending due to moment of forces. This is quite distinct from prior art constructions where the spring force has been transmitted to a retaining collar of a coupling member at a distance adjacent the interior of the casing shell. In such a prior art construction, given the same spring force as the present embodiment contemplates, bending stress due to the moment of forces would be the paramount stress factor thus requiring a much heavier and larger collar.

Similarly, at the lower end of casing 5 the spring 30*g* imposes the spring force on retaining ring 14 adjacent the casing shell 10. Thus, the shear stress rather than stress due to the moment of forces will control the size of the ring.

As a result, both the collar 22 and retaining ring 14 can be held to a minimum size as compared to prior art disc spring hangers without a loss of efficiency or strength of the hanger.

It is to be understood that the above description and accompanying drawings are to be deemed primarily as illustrative of the preferred mode presently contemplated of carrying out the principles of the invention, and that the device described and illustrated may be modified or alterned in its form, proportions, details of construction, and arrangement of parts without departing from the spirit and scope of the invention as defined in the appended claims.

What I claim and desire to secure by Letters Patent is:

1. A spring hanger for supporting a variable load comprising:

(a) a hollow cylindrical casing shell having two ends, (b) an end closure member joined to one end of said shell, (i) means joined to said closure member for attachment to a support rod, (c) spring abutment means joined to the other end of said shell and extending inwardly toward the axis of said shell, said abutment means containing, (i) an opening therethrough at its central portion, (d) a hollow cylindrical elongated coupling member extending through said opening of said abutment means with one end within the interior of said casing shell and the other end exteriorly of the shell, (i) a retainer collar joined to the exterior of said coupling member at the said one end, (ii) a threaded fastening nut joined to said other end of said coupling member coaxially therewith, (e) an odd numbered plurality of disc springs of similar configuration contained within said shell between said abutment means and said retainer collar, each of said springs having, (i) an axial opening therethrough through which said coupling member extends, (A) the spring closest to said retainer collar bearing against said collar at the edge defining the axial opening through said spring, (B) the spring closest to said abutment means bearing against said abutment means at the outer periphery of said spring, (C) each of the intermediate springs being oriented to transmit load from the outer periphery of the spring closest to said retainer collar to the edge defining the axial opening through the spring closest to said abutment means.

2. A spring hanger as called for in claim 1, wherein, the spring abutment means contains a plate having a central opening therethrough.

3. A spring hanger for supporting a variable load comprising:

(a) a hollow cylindrical casing shell having two ends, (b) an end closure member joined to one end of said shell having a centrally oriented hole therethrough, (i) a threaded fastening nut joined to said closure member coaxially with said hole, (c) a spring abutment member joined to the other end of said shell and extending inwardly toward the axis of said shell, said abutment member having, (i) an opening therethrough at its central portion, (d) a hollow cylindrical elongated coupling member extending through the opening of said abutment with one end within the interior of said casing shell and the other end exteriorly of the shell, (i) a retainer collar joined to the exterior of said coupling member at the said one end, (ii) a threaded fastening nut joined to said other end of said coupling member coaxially therewith, (e) an odd numbered plurality of disc springs of similar dished configuration alternately oriented and contained within said shell between said abutment member and said retainer collar, each of said springs having, (i) an axial opening therethrough through which said coupling member extends, (A) the spring closest to said retainer collar bearing against said collar at the edge defining the axial opening through said spring, (B) the spring closest to said abutment member bearing against said abutment member at the outer periphery of said spring, (C) each of the intermediate springs being in successive contact with each other and being oriented to transmit load from the outer periphery of the spring closest to said retainer collar to the edge defining the axial opening through the spring closest to said abutment member.

References Cited by the Examiner

FOREIGN PATENTS 1,019,918 11/1957 Germany.
1,043,725 11/1958 Germany.

ARTHUR L. LA POINT, *Primary Examiner.*

R. M. WOHLFARTH, *Assistant Examiner.*